(12) United States Patent
Hogan et al.

(10) Patent No.: US 11,888,418 B2
(45) Date of Patent: Jan. 30, 2024

(54) CONTROL STRUCTURES FOR PARALLEL MOTOR DRIVE CONTROL ARCHITECTURES

(71) Applicant: Hamilton Sundstrand Corporation, Charlotte, NC (US)

(72) Inventors: Diarmaid John Hogan, Cork (IE); Virgilio Valdivia Guerrero, Roquetas de Mar (ES); Andrei Dinu, Leicester (GB); Rodrigo Fernandez-Mattos, Solihull (GB)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/669,604

(22) Filed: Feb. 11, 2022

(65) Prior Publication Data
US 2022/0302861 A1 Sep. 22, 2022

(30) Foreign Application Priority Data
Feb. 12, 2021 (EP) .................... 21156958

(51) Int. Cl.
*H02P 21/00* (2016.01)
*H02P 21/22* (2016.01)
*H02P 27/06* (2006.01)

(52) U.S. Cl.
CPC .......... *H02P 21/0003* (2013.01); *H02P 21/22* (2016.02); *H02P 27/06* (2013.01)

(58) Field of Classification Search
CPC ....... H02P 21/0003; H02P 21/22; H02P 27/06
See application file for complete search history.

(56) References Cited

U.S. PATENT DOCUMENTS

| 5,757,634 | A  | 5/1998  | Ferens |
| 6,298,289 | B1 | 10/2001 | Lloyd et al. |
| 6,768,658 | B2 | 7/2004  | Perry |
| 8,188,694 | B2 | 5/2012  | Tallam et al. |
| 8,886,994 | B2 | 11/2014 | Czajkowski |

(Continued)

FOREIGN PATENT DOCUMENTS

| CN | 202004680 U | 10/2011 |
| EP | 3276816 A1 | 1/2018 |

(Continued)

OTHER PUBLICATIONS

Abstract for CN202004680 (U), Published Oct. 5, 2011.
European Search Report for Application No. 21156958.7, dated Jul. 21, 2021, 9 Pages.
Song et al. "Using fuzzy control for parallel-inverter system with nonlinear-load" Electrical Machines and Systems (ICEMS), 2010 International Conference on, IEEE, Piscataway, NJ, USA, Oct. 10, 2010, pp. 193-197.

(Continued)

*Primary Examiner* — Zoheb S Imtiaz
(74) *Attorney, Agent, or Firm* — CANTOR COLBURN LLP

(57) ABSTRACT

A proportional integrator for control of a motor drive arranged to be connected in parallel with one or more other motor drives to drive a common load. The proportional integrator includes means to receive an input command signal and to compare with a local measured signal from the motor drive and to output a local control signal for that motor drive. Also includes are a global input signal indicative of the behaviour of the one or more other motor drives, the global input signal being incorporated into the proportional integral function with the input command signal and the local measured signal to provide the local control signal.

20 Claims, 5 Drawing Sheets

(56) References Cited

U.S. PATENT DOCUMENTS

| | | | |
|---|---|---|---|
| 9,257,934 | B2 | 2/2016 | Hamada et al. |
| 9,577,424 | B2 | 2/2017 | Campbell |
| 9,667,152 | B2 | 5/2017 | Cao et al. |
| 9,793,819 | B2 | 10/2017 | Ramamurthy et al. |
| 9,857,812 | B2 | 1/2018 | Giuntini et al. |
| 10,020,759 | B2 | 7/2018 | Krolak et al. |
| 2007/0230925 | A1* | 10/2007 | Hwang ............... H02P 7/2855 388/803 |
| 2008/0197800 | A1* | 8/2008 | Bae ................... B60L 50/51 318/807 |
| 2013/0141952 | A1* | 6/2013 | Kaneko ............... H02M 7/493 363/72 |
| 2016/0258657 | A1* | 9/2016 | Feng .................. F25B 25/005 |

FOREIGN PATENT DOCUMENTS

| | | |
|---|---|---|
| EP | 3646455 A1 | 5/2020 |
| WO | 2005031939 A1 | 4/2005 |
| WO | 2018206085 A1 | 11/2018 |
| WO | 2019184880 A1 | 10/2019 |

OTHER PUBLICATIONS

Yongqing, et al. "Control of Parallel Inverters Based on CAN Bus in Large-Capacity Motor Drives" DRPT2008 Apr. 6-9, 2008 Nanjing China, pp. 1375-1379.

* cited by examiner

CONTROL STRUCTURES FOR PARALLEL MOTOR DRIVE CONTROL ARCHITECTURES

CROSS-REFERENCE TO RELATED APPLICATIONS

This application claims priority to European Patent Application No. 21156958.7 filed Feb. 12, 2021, the entire contents of which is incorporated herein by reference.

TECHNICAL FIELD

The present disclosure is concerned with power drive systems for controlling one or more loads, and in particular with parallel motor drive systems and how to control such systems to handle saturation of integrators within each motor drive.

BACKGROUND

Many applications require electronic control architectures to control several loads. Typically such architectures include motor drives comprising power converters to convert an input from a power supply (AC or DC) to an output of a different voltage appropriate to the load to be driven. Traditionally, each load would have its own dedicated power supply and its own dedicated motor drive, since the different loads may have different power and control requirements. In other systems, the motor loads may be supplied from a common power supply, but each still has its own dedicated motor drive. The development of power converters for respective loads is a significant part of the non-recurring cost incurred in developing new systems.

In some fields, there is a desire or a trend to reduce the number of system components in order to e.g. reduce weight or size, complexity and/or cost.

In aircraft, there is currently a trend towards so-called More Electric Aircraft (MEA) whereby loads such as flight control surfaces, landing gear, actuators, fans, pumps etc. which have traditionally be controlled by hydraulic and mechanical systems are now being designed to be controlled electrically by means of an electric motor. Steps are also being made towards All Electric Aircraft, where all loads, including the propulsion systems, will be controlled by electric motors. Whilst there are clear and significant advantages to electrical control of aircraft systems, and electrical control of systems in other fields, in terms of weight, size, reliability, environmental factors, cost and maintenance, further improvements can be made.

Recently, it has been considered whether control architectures might be designed that allow multiple potential loads to be driven using standard motor drives. Multiplexed motor drive systems have been designed for use in e.g. MEA. In such systems, multiple motor drives are interfaced to electrical loads via a switching matrix that reconfigures the connections between motor drives and loads/motors. Such systems are useful in applications where the loads are not all used simultaneously and so the motors can be allocated amongst the loads as they need to be powered. In an aircraft, for example, an electrical thrust reverser actuator and a landing gear electrical retraction actuator are not required to operate at the same time and so can be powered by the same motor drive at different times. Such a design has a greatly reduced size and weight and associated cost and complexity.

Along similar lines, switching matrices can be used to parallel-connect multiple drives to power large loads. This avoids the need to have large drives always available for such large loads. Ideally, the weight of the inductive components used in interfacing the parallel drives should be minimised; the drives should be scalable and modular so that they can easily be switched between parallel operation and stand-alone operation; the designs should enable fast current control loop dynamics and the need for high bandwidth communications should be minimised.

An example of an architecture that enables switching between parallel and stand-alone operation is shown in FIG. 1 described further below.

In motor drive systems, 'Single Event Upset' can be considered as a random event whereby a single bit in the system controller (CPU, FPGA, DSP, etc.) can be flipped, or 'upset', as a consequence of cosmic radiation. In the case of this occurring within the motor drive controller structure, it is possible that a Single Event Upset could result in the sudden saturation of a controller integrator. For parallel motor drive systems, such an occurrence would be problematic since the sudden saturation within one controller of one drive in a parallel configuration may result in a current transient which could de-stabilise the system behaviour. To achieve seamless response and ensure current balance across the motor drives, the integrators in the drives should also be reset or initialised after every computational step to ensure that all motor drives are working from the same initial conditions.

There is, therefore, a need to provide a simple, effective and reliable single event ride through capability for a motor drive control system having parallel-connected motor drives.

In motor drive systems that operate parallel drives, each motor drive may receive a common voltage setpoint/reference from a central controller in 1 order to ensure they are all operating to the same setpoint/reference. The impact of local component and sensor tolerances, however, can result in each local motor drive supplying a different current (even though they are using the same global setpoint).

It has been found that using conventional control structures can then result in the integrators saturating to positive and negative limits. This is due to the inherent current differences between the local motor drives, and each motor drive configured to drive its local current error to zero. Since the voltage reference used is a global one, the result is a windup of the integrators in the local controller of each motor drive as they fail to drive their local error to zero.

For a parallel motor drive system to correctly function, therefore, it is desired to modify the control structure to ensure global functionality when operating in parallel to prevent such saturation under normal operating conditions.

SUMMARY

According to an aspect of the disclosure, there is provided a proportional integrator for control of a motor drive arranged to be connected in parallel with one or more other motor drives to drive a common load, the proportional integrator comprising means to receive an input command signal and to compare with a local measured signal from the motor drive and to output a local control signal for that motor drive, wherein the input control signal is a speed reference signal and the local measured signal is a local speed signal, and further comprising means for adding a correction factor to the proportional integral function, the correction factor selected to balance the integral term dependent on a total of current reference commands from the motor drive and all motor drives connected in parallel with the motor drive, in use.

According to an aspect of the disclosure, there is provided a proportional integrator for control of a motor drive arranged to be connected in parallel with one or more other motor drives to drive a common load, the proportional integrator comprising means to receive an input command signal and to compare with a local measured signal from the motor drive and to output a local control signal for that motor drive, further comprising a global input signal indicative of the behaviour of the one or more other motor drives, the global input signal being incorporated into the proportional integral function with the input command signal and the local measured signal to provide the local control signal.

An aspect of the disclosure may include a motor drive arranged to be connected in parallel with one or more other motor drives to drive a common load, the motor drive including the proportional integrator of either aspect described above. The motor drive may comprise a speed control loop and a current control loop.

An aspect of the disclosure may include a motor drive assembly comprising a plurality of the motor drives including the proportional integrator of either aspect described above, and a central controller arranged to provide the input command signal to each proportional integrator.

BRIEF DESCRIPTION OF THE DRAWINGS

Some examples of implanting the ideas of this disclosure will now be described, by way of example only, with reference to the drawings.

DETAILED DESCRIPTION

The present disclosure is concerned with control of motor drives to address issues that can arise particularly when operating in parallel to drive a common load.

Figure 1:
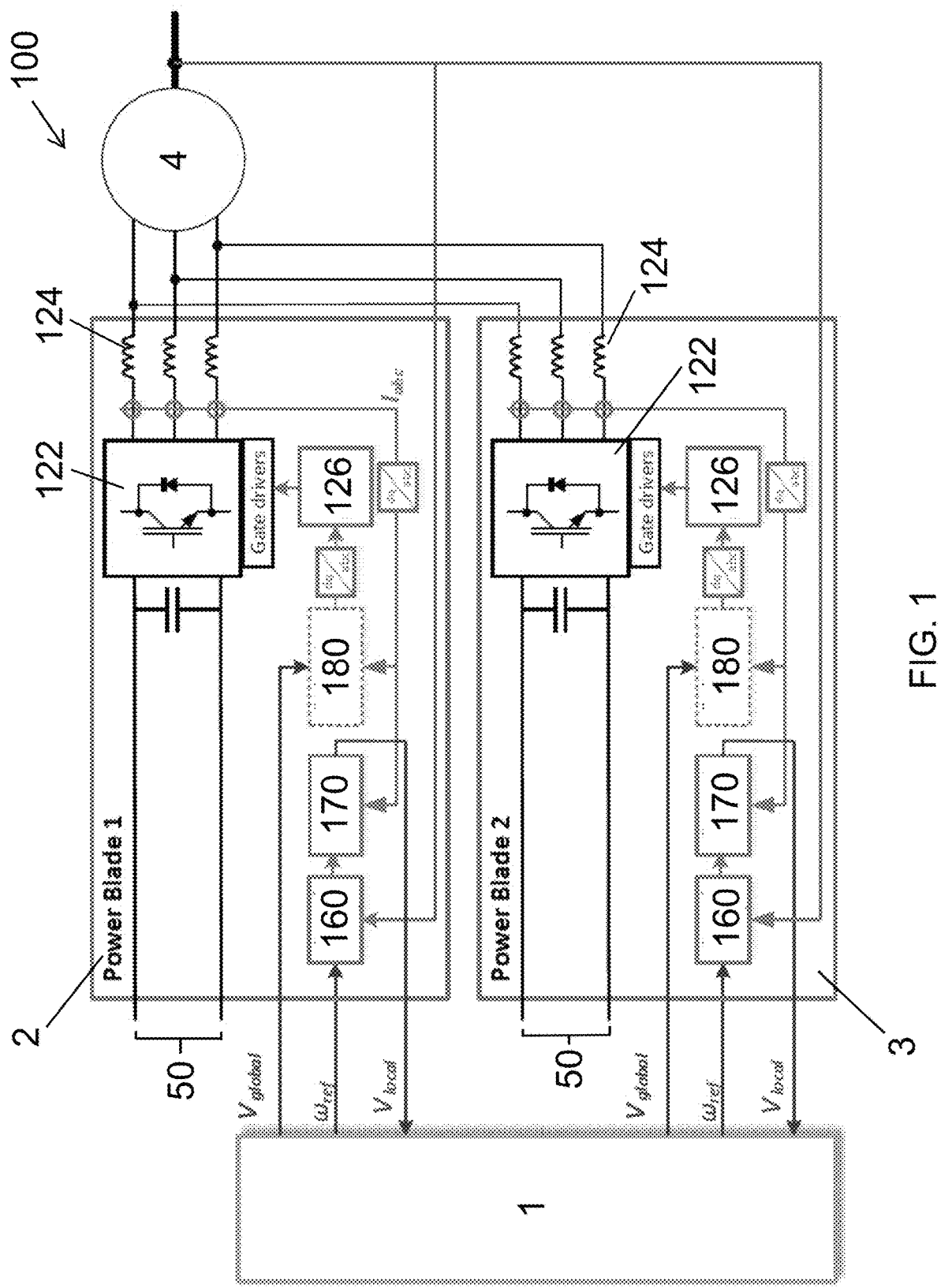
FIG. 1 shows an example of a parallel motor drive architecture into which the PI according to the disclosure could be incorporated.

System level control architectures have been proposed to facilitate the operation of multiple motor drives operating in parallel to regulate the total load current, speed or position, depending on the application. FIG. 1 shows an example of such a parallel drive architecture.

FIG. 1 shows a system 100 comprising a plurality of motor drives 2, 3 that may each include an inverter 122 and output inductors 124. The motor drives 2, 3 may each receive DC power via input terminals 50. This may then be converted by the inverter 122 into an output voltage (e.g., a three-phase AC voltage) for actuating a load via inductors 124.

The plurality of motor drives 2, 3 are provided with a common or centralised operation (e.g., control system) to synchronise their operation. Accordingly, the motor drives 2, 3 may be controlled centrally using a central controller 1, which is configured to control the motor drive(s) 2, 3 to be used at a particular time. The central controller 1 achieves this by switching between the motor drives using a modulation scheme or technique.

The FIG. 1 arrangement combines the use of local current controllers (e.g., current control loops) and the central controller 1, wherein the local current controllers are configured to receive current values associated with each output voltage phase of the inverter 122 (e.g., measured at an output of each inverter 122 and optionally presented in a synchronous reference frame or "d-q system"), and then calculate a local voltage reference Vlocal for the respective motor drive 2, 3 to be transmitted to the central controller 1.

The central controller 1 is configured to determine or calculate a global voltage reference Vglobal based on the local output voltage references Vlocal from each of the paralleled motor drives 2, 3. The global voltage reference Vglobal may be an average or sum of the local voltage references Vlocal. The global voltage reference Vglobal is then transmitted back to each local motor drive 2, 3 to be used as part of the modulation (e.g., to generate suitable modulation duty cycles). For example, the modulation elements may generate a suitable switching pattern for the inverters 122 based on the global voltage reference Vglobal.

An optional balancing network 180 may be used within each motor drive 2, 3 that can form a supplementary element of the local control scheme. The balancing network 180 may be configured to adjust the global voltage reference Vglobal based on the local output currents of the respective inverter 122. This can help to alleviate differences in output currents between the motor drives 2, 3.

Any suitable method or type of modulation may be employed. In particular, the modulation may comprise pulse width modulation ("PWM") such as space vector modulation ("SVM"). Each motor drive 2, 3 may include a modulation module 126 configured to control the synchronisation of the motor drive 2, 3, for example the synchronisation of a switching frequency of the modulation, e.g., using PWM or SVM.

The central controller 1 is configured to receive the plurality of local voltage reference values Vlocal from each of the motor drives 2, 3 and calculate the global voltage reference Vglobal based on (e.g., a sum of) the local voltage reference values Vlocal, and then transmit the global voltage reference Vglobal to each of the motor drives 2, 3. The modulation of the output voltage of each inverter 122 uses a modulation scheme or technique, which is applied using the modulation module 126 as discussed above. That is, the modulation module 126 is configured to regulate the output current(s) of each inverter 122 based on the global voltage reference Vglobal.

More specifically, each motor drive 2, 3 includes components (e.g., processor or circuitry) that form one or more control loops, including in the illustrated embodiment a speed loop 160 and a current loop 170. The central controller 1 is configured to output a reference that is used in these loops to control the duty cycle of the switching signals.

For example, a reference speed $\omega$ref may be given to all power converters (e.g., motor drives 2, 3) operating in parallel, and may be set by the central controller 1 or elsewhere (e.g., a flight control computer, or other component or module). For example, a flight controller may be commanding that a component moves by actuating to a certain position at a given speed. Where a speed loop 160 is included, this would be configured to generate a suitable reference current, which is then input into the current loop 170 to regulate the output current of the motor drive (described below), in effect regulating the speed of rotation of the motor.

A speed loop 160 is not essential, however, for example in cases where the load is not a motor, or the rotational speed of the motor does not otherwise require regulation. In such a case the central controller 1 could output a reference current for inputting directly into the current control loop 170.

The system 100 may pick up an actual machine speed ω from the output of the motor.

Each (local) current control loop 170 is configured to calculate a local voltage reference Vlocal for the motor drive 2, 3 as discussed above. The current loop 170 is configured to regulate the output current of the respective motor drive 2, 3, so as to ensure the motor drives 120 operating in parallel work together adequately and effectively. That is, to generate the correct currents, the output voltage of the motor drive 2, 3 needs to be set correctly. The current loop 170 (and speed loop 160 if provided) are used to calculate the local voltage reference Vlocal, which is then used to generate the correct switching sequence of the motor drives 2, 3 (e.g., via the modulation technique or scheme) to facilitate this.

Using a local current control loop (rather than this being centralised) leads to a more scalable and less complex system than previous solutions.

The distributed system 100 typically uses a synchronous reference frame control, which is known in the art (also called "d-q control"). Using such a control mechanism, the voltage and current can be converted into a reference frame that rotates synchronously with a voltage vector (e.g., by Park Transformation) so that three-phase time-varying signals are transformed into DC signals. Using "d-q currents" provides a convenient way of representing the output current of the motor drive, and analysing the system.

In a slight modification, the central controller 1 could be configured to output a global current reference based on local current reference values at the inverters 122, and transmit the global current reference value to each of the motor drives 2, 3 (instead of a global voltage reference Vglobal). The modulation of the output voltage of each inverter 122 uses a modulation scheme or technique as discussed above. The modulation module 126 still receives a local voltage reference as an input, but the local voltage reference is based on (e.g., scaled with) the global current reference (rather than using a global voltage reference Vglobal as shown in FIG. 1). Accordingly, the modified system may be configured to regulate the output current(s) of the inverters 122 based on the global current reference.

Control architectures such as those shown and described in respect of FIG. 1 rely on the inner control loops (e.g., speed and/or current control loops 160, 170) to calculate appropriate switching duty cycles for the inverters 122, so as to regulate their local output current and, under correct operation, deliver the correct machine current with limited current recirculation or distortion.

As mentioned above, a problem with such parallel drive systems is that a single event upset can result in the sudden saturation of the integrators of one of the controllers, which can propagate through all of the parallel drives leading to an overall lack of control by the system.

A related problem (also mentioned above) is the gradual saturation of each individual integrator (e.g., within the current control loop 170), which may be caused by the practical limitations of parallel operation. That is, slight differences in sensor tolerance or component values (such as resistance and inductance) will never be exactly equal across the motor drives 2, 3 operating in parallel. This can result in the local integrators (that are configured to drive any local errors to zero) eventually saturating to a positive or negative limit. This negatively affects—the dynamic performance of the system as a whole.

Figure 2:
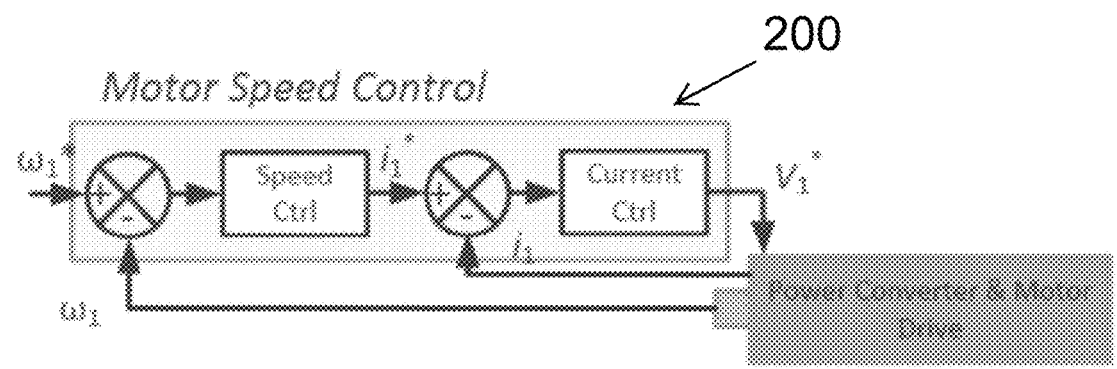
FIG. 2 is a schematic view of a conventional motor control scheme.
Figure 3:
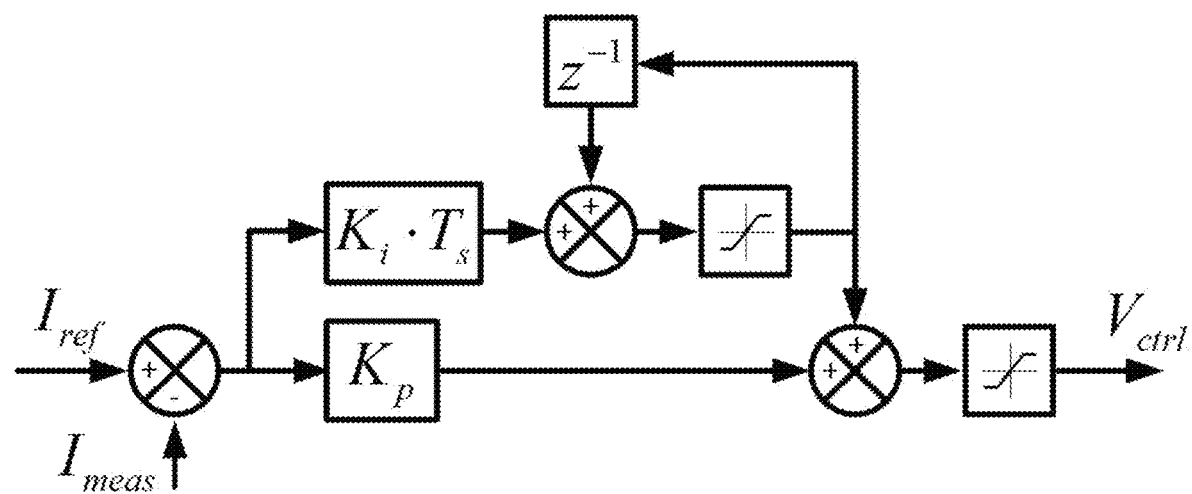
FIG. 3 shows a conventional PI control.

FIG. 2 shows a simplified motor drive control scheme to explain certain problems with having parallel motor drives controlled by a single central controller 1. The motor control unit 200 receives a motor speed input ω1 and outputs a motor control voltage V1* to the power converter and motor drive. The motor control unit 200 has an inner current feedback control loop containing a current control circuit and an outer speed control loop containing a speed control circuit. FIG. 3 shows a conventional proportional integral controller for the current control loop for regulating motor current as is known.

Referring back to FIG. 1, in a parallel architecture each motor drive will have a structure such as shown in FIG. 2, with the current loop 170 designed as a proportional integrator as shown in FIG. 3 ("PID" controller or proportional integral controller). The input to the speed loop ω1* in FIG. 2, will be ωref from the central controller. The speed loop will provide a reference current iref to the current loop 170 (FIG. 1) which will be compared and integrated using the local measured current imeas1, to output a local control voltage Vlocal. This is provided to the central controller 1. The central controller combines Vlocal from each of the parallel drives to provide the global voltage Vglobal.

Various types of proportional integrator may be used within each of the motor drives, and the disclosure should not be limited to a particular type (e.g., the current loop shown in FIG. 3). These types of integrator may be referred to simply as "integrators" herein, for brevity.

Such structures will not be described in further detail. Each motor drive will have different local component and sensor tolerances, and so each motor drive will supply a different output. Neither local controller will be able to regulate their output current to the correct value, as there will be circulating current flowing between the parallel motor drives due to these component and sensor tolerance issues. As noted above, without compensation this will result in integrator wind up and saturation.

For a parallel drive system to function correctly, it has been found necessary to integrate local controls which can avoid gradual saturation, whilst also handling single event upset. This can ensure global functionality to prevent such issues under normal operating conditions.

The present disclosure provides a control scheme whereby a 'global integrator signal' can be derived, based on local signals and on a global reference (e.g., the global voltage reference referred to above), for initialisation of any proportional integrators in the motor drives.

The integrator of the current loop, for example, may be modified based on the global voltage reference. An example of the control scheme according to this disclosure will now be described with reference to FIG. 4. This example includes two power converters (in this case motor drives) operating in parallel. The system can, however, be adapted for more than two parallel drives.

The control scheme is arranged to cause initialisation of the proportional integrator based on a combination of the local controller output and the feedback from the global reference. In the embodiment shown, and as will be described further, the scheme generates an integer global average term along with an error term associated with the local control error.

Figure 4:
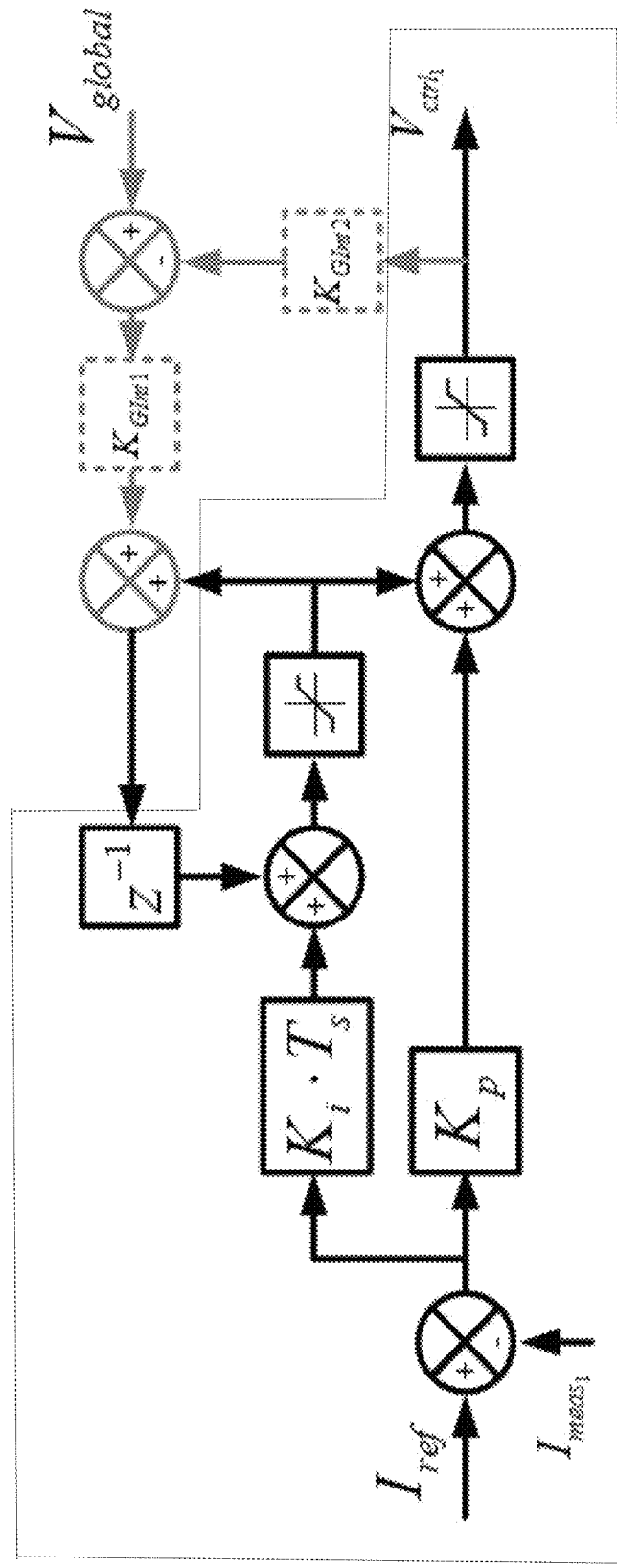
FIG. 4 shows an example of a current control proportional integrator adapted for integrator initialisation according to the disclosure.

The portion of FIG. 4 in dotted lines is essentially the same as the conventional proportional integrator shown in FIG. 3. As is conventional for current control, the control scheme compares the current demand, i.e., the reference current for the first drive 2 (derived, in this example, from the reference speed ωref input from the central controller) with the local current measured in the first drive 2 and performs a proportional integral function to provide a local control voltage Vctrl1 for the first drive. In addition, and in accordance with this disclosure, the local voltage demand of the first motor drive 2 is summed with a modified signal S which takes into account the local voltage demand of the second motor drive 3 (and other motor drives if more than two are connected).

In more detail, for each drive, the global voltage reference Vglobal from the central controller 1 is provided as an input to one or more of the proportional integrators of the local motor drives, and in this example the local current loop integrator. As mentioned above, the global voltage reference Vglobal may be a sum (or, e.g., an average) of all of the local current controller reference voltages in the system (e.g., Vglobal=Vlocal1+Vlocal2 . . . +VlocalN) where N is the number of parallel drives in the system. Thus, the global voltage reference Vglobal contains information about the behaviour of each drive in the system (i.e., the local controllers/circuitry thereof). By appropriate scaling of the signals using appropriate gains K, the global voltage reference Vglobal can be used to compare against the behaviour of the local drive, from Vctrl, to inject a modification (feedback) signal S into the local proportional integrator, which contains some information as to the behaviour of the other drives in the system. That is, subtracting a local output from the global voltage reference provides the information within the modification signal S that relates to all the other drives in the parallel system.

If, for example, the system includes two parallel drives, then Vglobal=Vctrl1+Vctrl2. The gain KGInt2 will be selected, in this case, as 2, and KInt1 will be selected as ½. The modification signal S, injected into the local proportional integrator, will, in that case, be equal to (Vglobal−(2*Vctrl1))*½. As Vglobal, for two drives, is equal to Vctrl1+Vctrl2, then the injected signal S is ½Vctrl2, i.e., is based on the output of the other drive.

Figure 5:
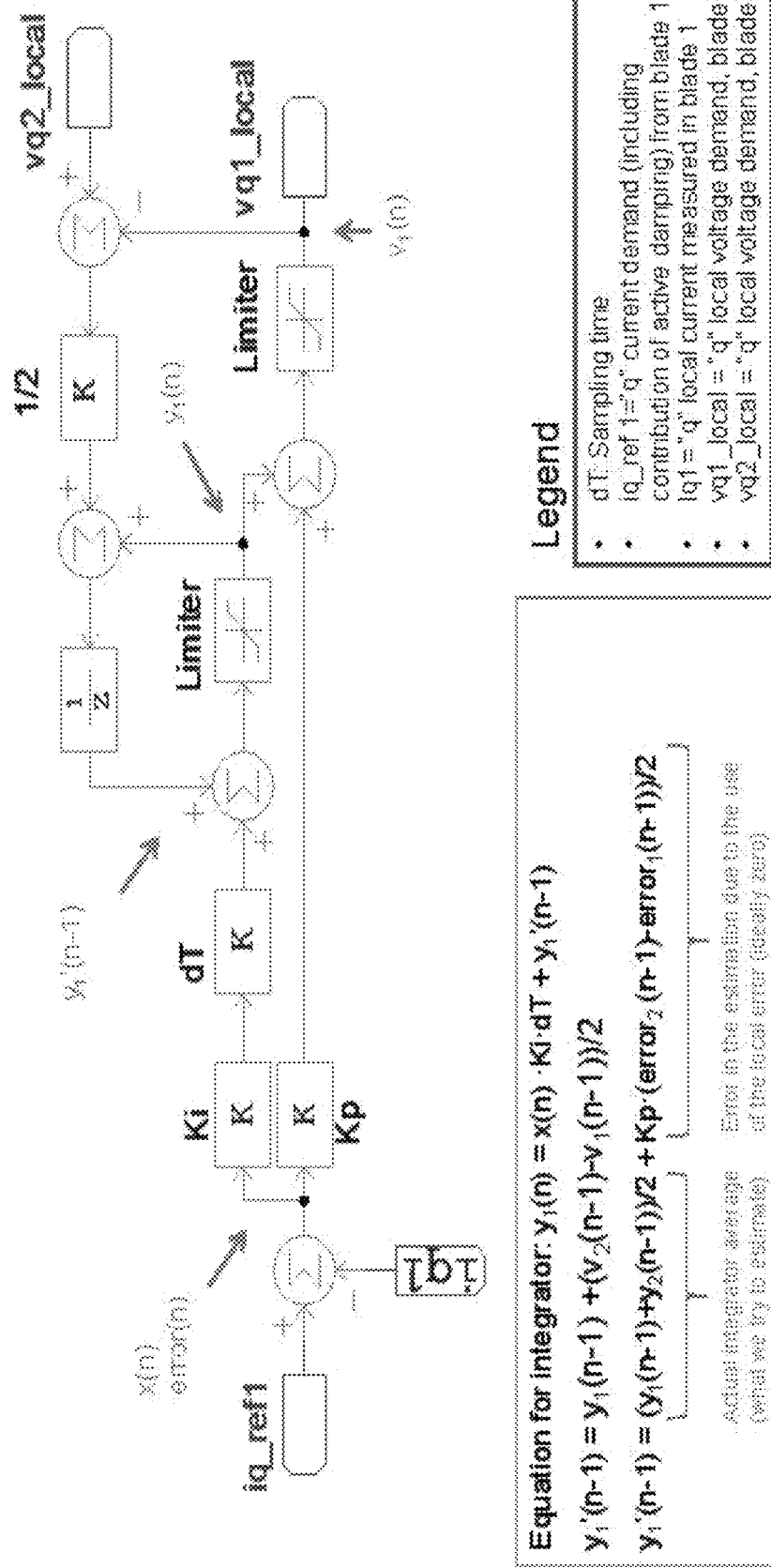
FIG. 5 shows an example of a current control proportional integrator in more detail adapted for integrator initialisation in a two-drive system according to the disclosure.

This can be seen in more detail, for the two drive system, in FIG. 5. Here, it can be seen that since Vq2-local contains information from the second drive, and as this is provided as an input to the local integrator for the first drive, the local integrator becomes, essentially, an average of the two local drives (including a small error term), so including some of the behaviour of the second drive into the first drive. This allows the system to balance itself.

The equation for the integrator is:

$$y_1(n)=x(n)\cdot Ki\cdot dT+y_1'(n-1)$$

and $$y_1'(n-1)=y_1(n-1)+(v_2(n-1)-v_1(n-1))/2$$

and $$y_1'(n-1)=y_1(n-1)+y_2(n-1))/2+Kp\cdot(error_2(n-1)-error_1(n-1))/2$$

where:
$y_1(n-1)+y_2(n-1))/2$ is the actual integrator average which is to be estimated, and
$Kp\cdot(error_2(n-1)-error_1(n-1))/2$ is the error in the estimation due to the use of the local error which, in an ideal case, is zero.

FIG. 5 shows the integrator of FIG. 4 in the context of a parallel motor drive control architecture with two parallel motor drives. As noted above, more than two motor drives may also be connected in parallel, as required, with the gains tuned accordingly.

Test have confirmed that the modified integrator control structure of this disclosure allows the system to maintain operation in the event of integrator saturation (whether gradual or sudden) in one of the current controls.

The modification to the PI can easily be bypassed/deactivated if the motor drive is to be used as a standalone drive rather than in a parallel assembly.

Whilst the modification of the integrator has been described in relation to the current loop, as noted above the same principle can be applied to any other proportional integrator used in the motor drive, for example that of the speed loop. In this case local current setpoints of other motor drives could be used to generate a global input signal to the integrator.

Generally, a proportional integrator of any one of the motor drives may comprise circuitry (processors or other means, etc.) configured to receive an input command signal and to compare this input command signal with a local measured signal from the respective motor drive. The circuitry may be configured to then output a local control signal for that motor drive. The proportional integrator may further comprise a global input signal indicative of the behaviour of the one or more other motor drives, the global input signal being incorporated into the proportional integral function of the integrator with the input command signal and the local measured signal to provide the local control signal.

Figure 6:
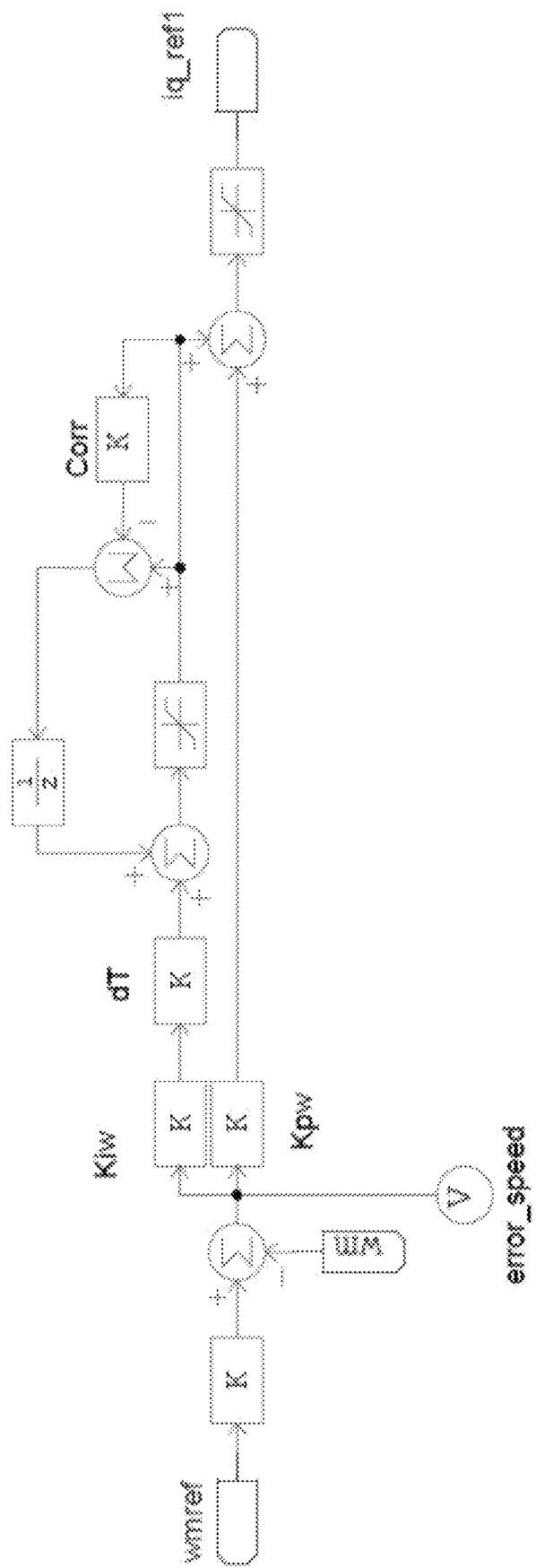
FIG. 6 shows an alternative proportional integrator modification for a speed control loop.

According to another aspect of the disclosure, the speed loop may be modified as shown in FIG. 6 to provide single event upset ride-through capabilities. Here a correction factor Corr is added to the proportional integrator of the speed loop that balances the integral term depending on the total current reference command. This is equivalent to limiting the steady-state gain of the proportional integral control of the speed loop. The correction factor Corr acts as a discharge term, slowly winding back each local integrator, allowing the system to maintain stability but performing more slowly. This simplified structure is possible because the speed loop does not need to react as quickly as the current loop to system transients caused by a single event upset and, therefore, it is not necessary to utilise a global feedback signal.

The present disclosure provides a modification to the conventional proportional integrator of the current and/or speed control loop that mitigates the impact of controller saturation resulting from parallel operation of motor drives. The approach can be easily switched in or out as required as motor drives transition from standalone operation to parallel operation.

The invention claimed is:

1. A proportional integrator for control of a motor drive arranged to be connected in parallel with one or more other motor drives to drive a common load, the proportional integrator comprising:
    means to receive an input command signal and to compare with a local measured signal from the motor drive and to output a local control signal for that motor drive, wherein the input command signal is a speed reference signal and the local measured signal is a local speed signal; and means for adding a correction factor to the proportional integral function, the correction factor selected to balance the integral term dependent on a total of current reference commands from the motor drive and all motor drives connected in parallel with the motor drive, in use;

wherein the input command signal is a current reference signal and the local measured signal is a measured current signal, and wherein the global input signal is a global voltage reference based on a local voltage reference from the motor drive and all motor drives connected in parallel with the motor drive, in use.

2. A motor drive arranged to be connected in parallel with one or more other motor drives to drive a common load, the motor drive including:
a proportional integrator as claimed in claim 1.

3. The motor drive of claim 2, comprising a speed control loop and a current control loop.

4. A motor drive assembly comprising:
a plurality of motor drives as claimed in claim 2; and
a central controller arranged to provide the input command signal to each proportional integrator.

5. A proportional integrator for control of a motor drive arranged to be connected in parallel with one or more other motor drives to drive a common load, the proportional integrator comprising:
means to receive an input command signal and to compare with a local measured signal from the motor drive and to output a local control signal for that motor drive; and
a global input signal indicative of the behaviour of the one or more other motor drives, the global input signal being incorporated into the proportional integral function with the input command signal and the local measured signal to provide the local control signal;
wherein the input command signal is a current reference signal and the local measured signal is a measured current signal, and wherein the global input signal is a global voltage reference based on a local voltage reference from the motor drive and all motor drives connected in parallel with the motor drive, in use.

6. The proportional integrator of claim 5, incorporated in a current control loop for the motor drive.

7. The proportional integrator of claim 5, incorporated in a speed control loop for the motor drive.

8. A motor drive arranged to be connected in parallel with one or more other motor drives to drive a common load, the motor drive including a proportional integrator as claimed in claim 5.

9. The motor drive of claim 8, comprising a speed control loop and a current control loop.

10. A motor drive assembly comprising a plurality of motor drives as claimed in claim 8, and a central controller arranged to provide the input command signal and the global input signal to each proportional integrator.

11. A method of controlling a plurality of motor drives connected in parallel to drive a common load, the method comprising:
performing, at each motor drive, a proportional integral function on an input command signal utilising a local measured signal of the motor drive and a global input signal indicative of the behaviour of the one or more other motor drives,
wherein the global input signal is incorporated into the proportional integral function with the input command signal and the local measured signal to provide a local control signal for each motor drive;
wherein the input command signal is a common signal provided to all of the motor drives from a central controller and the global input signal is provided to all motor drives from the central controller and is derived from a local reference from each motor drive.

12. The method of claim 11, wherein the global input signal is a global voltage reference derived from local voltage references from each motor drive.

13. The method of claim 11, wherein a gain factor is applied to the global input signal set based on local signals from all motor drives.

14. A proportional integrator for control of a motor drive arranged to be connected in parallel with one or more other motor drives to drive a common load, the proportional integrator comprising:
means to receive an input command signal and to compare with a local measured signal from the motor drive and to output a local control signal for that motor drive;
a global input signal indicative of the behaviour of the one or more other motor drives, the global input signal being incorporated into the proportional integral function with the input command signal and the local measured signal to provide the local control signal; and
tunable gains applying a gain factor to the global input signal depending on local signals from which the global input signal is derived.

15. The proportional integrator of claim 14, wherein the input command signal is a current reference signal and the local measured signal is a measured current signal, and wherein the global input signal is a global voltage reference based on a local voltage reference from the motor drive and all motor drives connected in parallel with the motor drive, in use,
wherein the proportional integrator is incorporated in a current control loop for the motor drive.

16. The proportional integrator of claim 14, wherein the input command signal is a speed reference signal and the local measured signal is a local speed signal, and wherein the global input signal is a global q-axis current reference based on a local current reference from the motor drive and all motor drives connected in parallel with the motor drive, in use.

17. The proportional integrator of claim 14, incorporated in a speed control loop for the motor drive.

18. A motor drive arranged to be connected in parallel with one or more other motor drives to drive a common load, the motor drive including a proportional integrator as claimed in claim 14.

19. The motor drive of claim 18, comprising a speed control loop and a current control loop.

20. A motor drive assembly comprising a plurality of motor drives as claimed in claim 18, and a central controller arranged to provide the input command signal and the global input signal to each proportional integrator.

* * * * *